(12) United States Patent
Sedor

(10) Patent No.: US 7,234,877 B2
(45) Date of Patent: Jun. 26, 2007

(54) FIBER OPTIC INDUSTRIAL CONNECTOR

(75) Inventor: Thomas M. Sedor, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/257,938

(22) Filed: Oct. 25, 2005

(65) Prior Publication Data

US 2006/0089049 A1    Apr. 27, 2006

Related U.S. Application Data

(60) Provisional application No. 60/622,636, filed on Oct. 27, 2004.

(51) Int. Cl.
G02B 6/38 (2006.01)

(52) U.S. Cl. .............. 385/71; 385/76; 385/77; 385/59

(58) Field of Classification Search ............ 385/53, 385/55, 56, 58–59, 60, 62, 70–71, 76–78, 385/81

See application file for complete search history.

(56) References Cited

U.S. PATENT DOCUMENTS

| | | | |
|---|---|---|---|
| 4,798,440 A | 1/1989 | Hoffer et al. | |
| 4,953,929 A | * 9/1990 | Basista et al. | 385/55 |
| 5,076,656 A | 12/1991 | Briggs et al. | |
| 5,123,071 A | 6/1992 | Mulholland et al. | |
| 5,475,781 A | 12/1995 | Chang et al. | |
| 5,528,712 A | 6/1996 | Belenkiy et al. | |
| 5,574,812 A | 11/1996 | Beier et al. | |
| 5,579,425 A | 11/1996 | Lampert et al. | |
| 5,608,830 A | 3/1997 | Belenkiy et al. | |
| 5,675,682 A | 10/1997 | De Marchi | |
| 6,024,498 A | 2/2000 | Carlisle et al. | |
| 6,206,580 B1 | 3/2001 | Nagaoka et al. | |
| 6,212,324 B1 | 4/2001 | Lin et al. | |
| 6,250,817 B1 | 6/2001 | Lampert et al. | |
| 6,357,934 B1 | 3/2002 | Driscoll et al. | |
| 6,409,392 B1 | 6/2002 | Lampert et al. | |
| 6,475,009 B2 | 11/2002 | Below et al. | |
| 6,511,230 B1 | 1/2003 | Connelly et al. | |
| 6,595,791 B2 | 7/2003 | Below et al. | |
| 6,672,898 B2 | 1/2004 | Kahle et al. | |
| 2004/0047565 A1 | 3/2004 | Cheng et al. | |

FOREIGN PATENT DOCUMENTS

EP    0408852 A2    1/1991

OTHER PUBLICATIONS

Corning Cable Systems' LC Compatible Ultra PC Cable Assemblies Brochure, 2 pages, Mar. 2001.

* cited by examiner

Primary Examiner—Frank G. Font
Assistant Examiner—Michael P. Mooney
(74) Attorney, Agent, or Firm—Robert A. McCann; Christopher S. Clan

(57) ABSTRACT

A fiber optic industrial connector includes a connector holder and a duplex clip assembly secured within the connector holder. The duplex clip assembly includes a duplex clip and two connectors secured within the duplex clip. The duplex clip has a front surface and a rear surface, and two openings positioned between the front surface and the rear surface. The duplex clip also has a projecting member extending from the rear surface and toward the front surface.

14 Claims, 18 Drawing Sheets

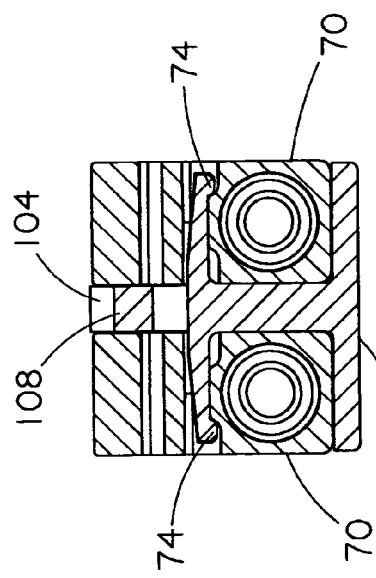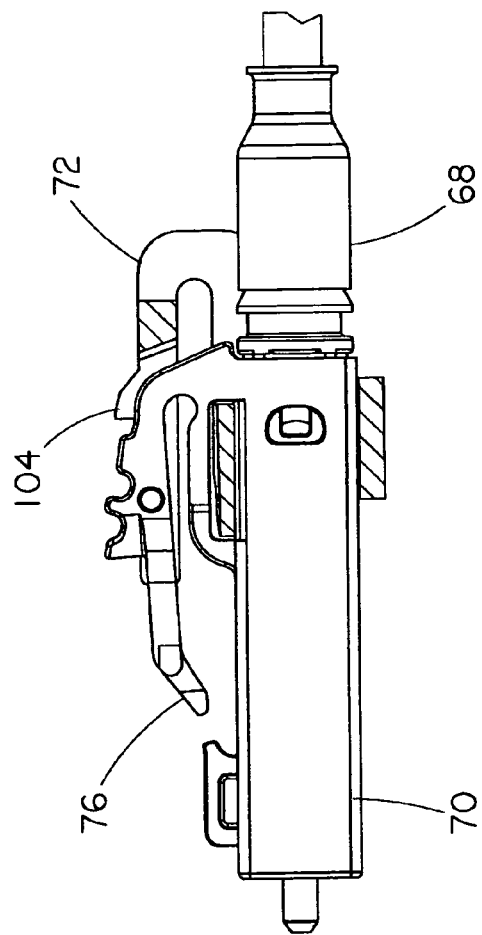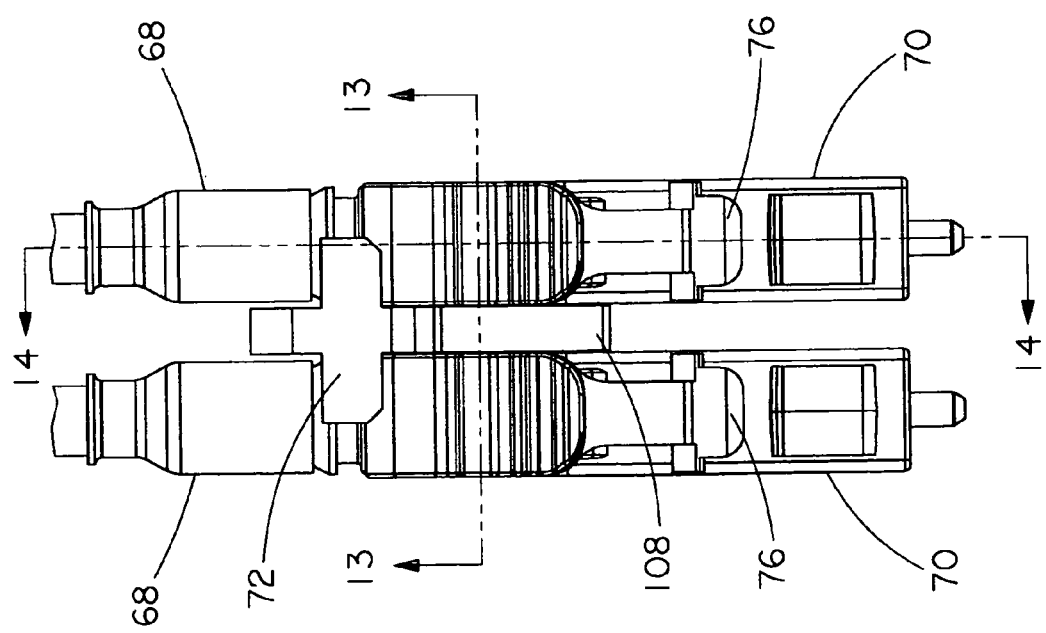

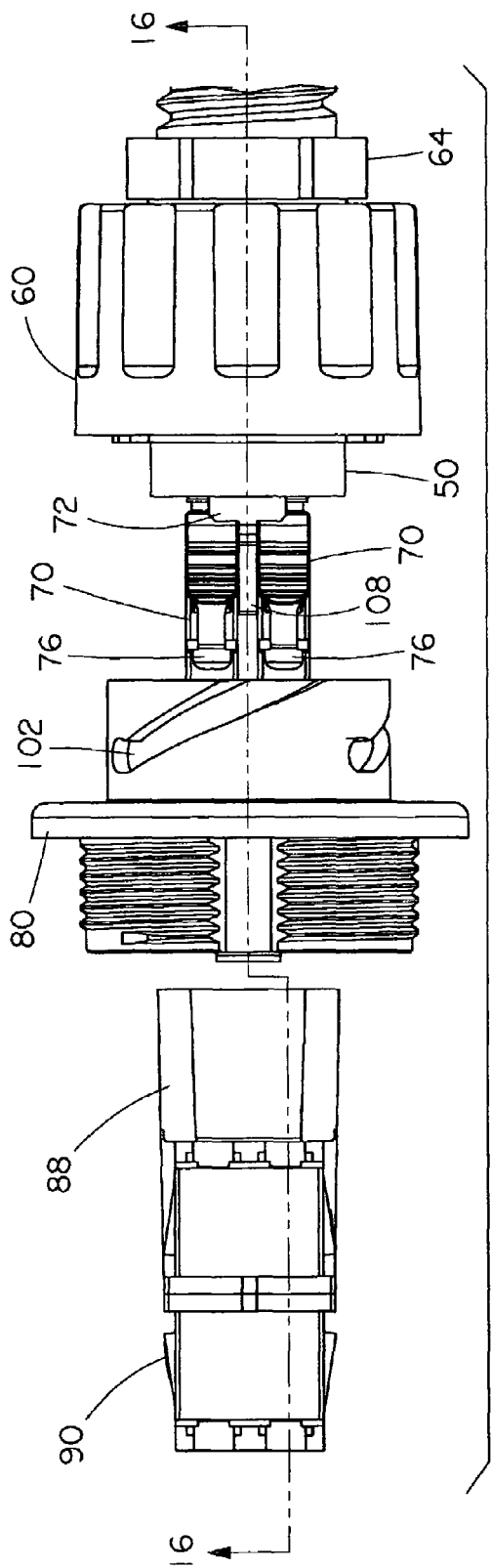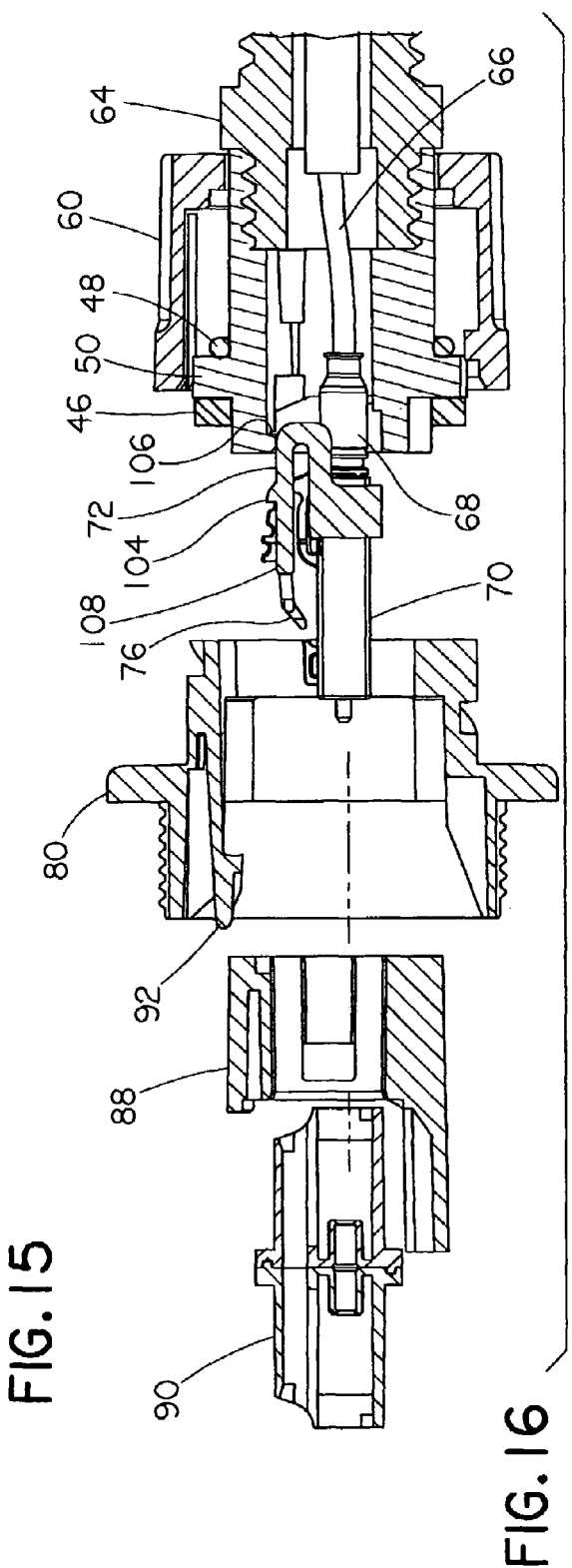
FIG.15
FIG.16

FIBER OPTIC INDUSTRIAL CONNECTOR

CROSS-REFERENCE TO RELATED APPLICATIONS

This application claims priority to U.S. Provisional Application Ser. No. 60/622,636, filed on Oct. 27, 2004, the entirety of which is incorporated herein by reference.

BACKGROUND OF THE INVENTION

The present invention is directed to a fiber optic industrial connector and, more particularly, an LC fiber optic industrial connector.

Industrial telecommunication connectors are known in the art, as shown and described in U.S. Pat. Nos. 6,475,009 and 6,595,791. The '009 and '791 patents disclose RJ-45 connectors, which do not include duplex clip and connector assemblies. Moreover, none of these prior art industrial connectors disclose an LC fiber optic industrial connector that allows simple removal of the LC connectors during or after termination.

SUMMARY OF THE INVENTION

It would be desirable to provide an LC fiber optic industrial connector that allows simple removal of the LC connectors during or after termination.

It would also be desirable to provide an LC fiber optic industrial connector having an LC duplex clip and two LC connectors removably secured to an LC connector holder.

A fiber optic industrial connector includes a connector holder and a duplex clip assembly secured within the connector holder. The duplex clip assembly includes a duplex clip and two connectors secured within the duplex clip. The duplex clip has a front surface and a rear surface, and two openings positioned between the front surface and the rear surface. The duplex clip also has a projecting member extending from the rear surface and toward the front surface.

Preferably, the connector holder has a retaining wall along an inside surface thereof.

Preferably, each duplex clip opening is substantially C-shaped and has a latch on an inside surface thereof.

Preferably, the projecting member is a cantilevered beam and includes a latch positioned thereon.

Preferably, the fiber optic industrial connector is an LC style connector.

BRIEF DESCRIPTION OF THE FIGURES

FIG. 12 is a top view of the LC connectors and LC duplex clip shown in FIG. 11;

FIG. 13 is a cross-sectional view taken along lines 13—13 of FIG. 12;

FIG. 14 is a cross-sectional view taken along lines 14—14 of FIG. 12;

FIG. 15 is a partial exploded top view of the industrial connector of FIG. 2;

FIG. 16 is a cross-sectional view taken along lines 16—16 of FIG. 15;

DETAILED DESCRIPTION OF PREFERRED EMBODIMENTS

Figure 1:
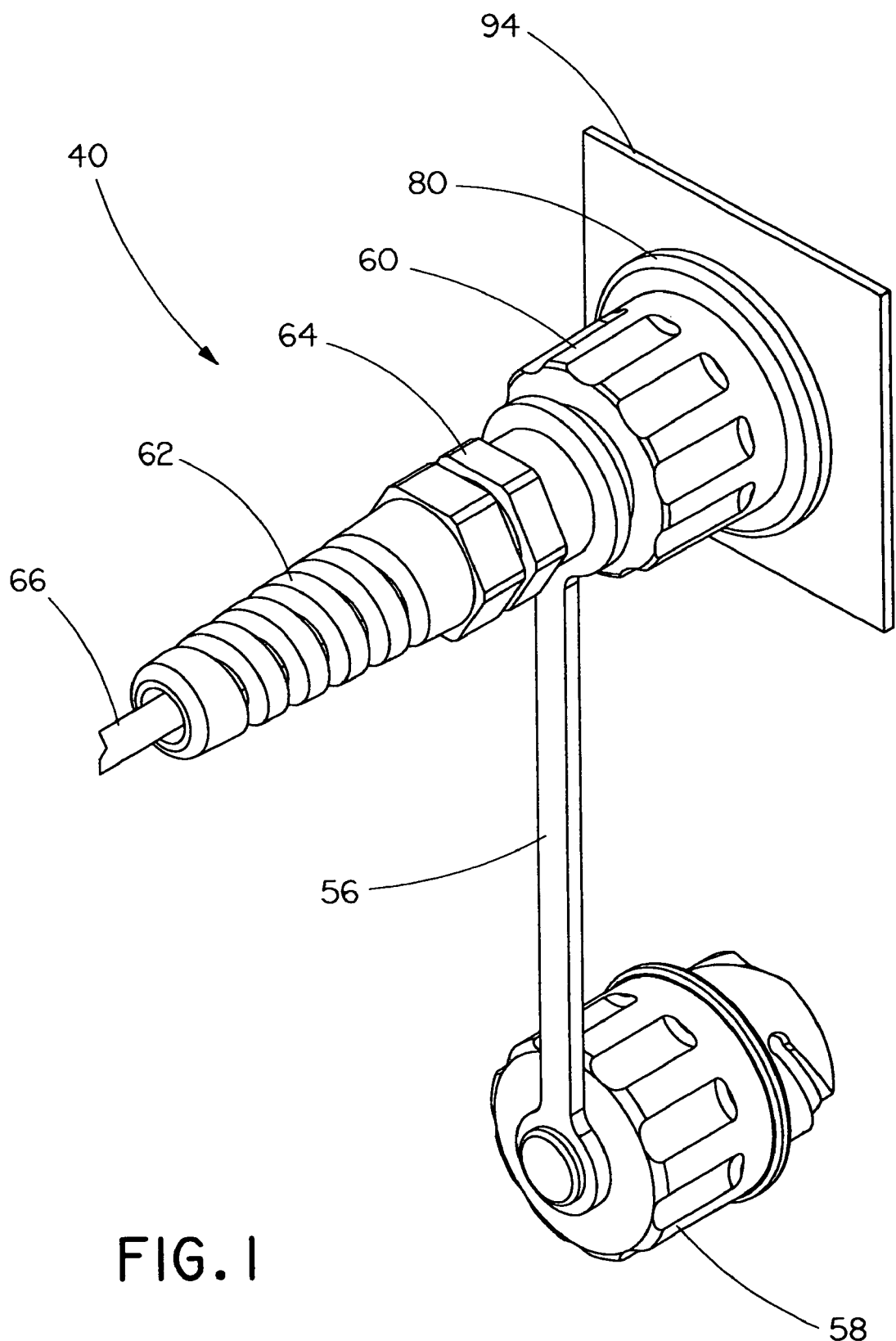
FIG. 1 is a rear perspective view of an assembled industrial connector according to the present invention.
Figure 2:
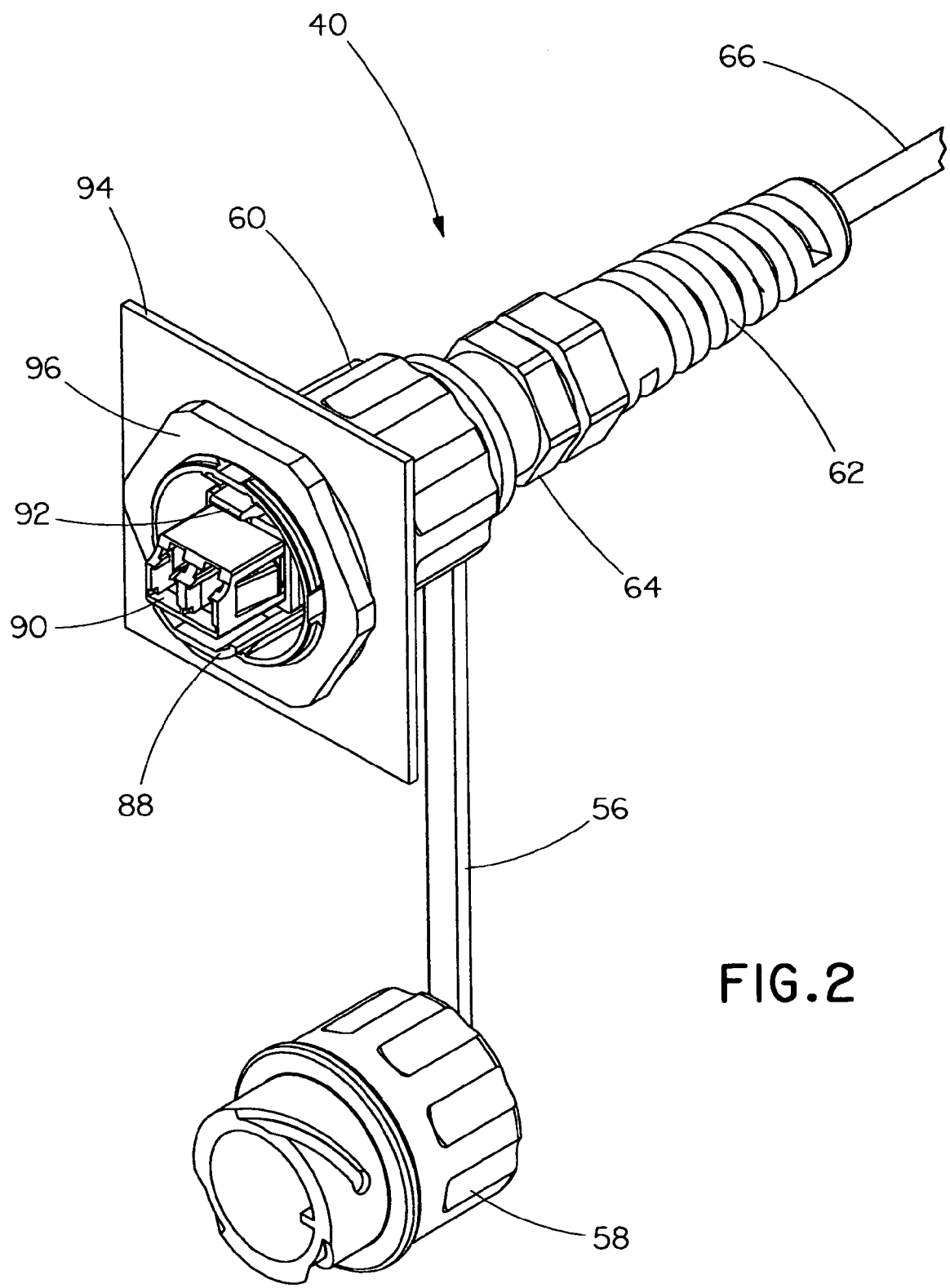
FIG. 2 is a front perspective view of the industrial connector of FIG. 1.
Figure 3:
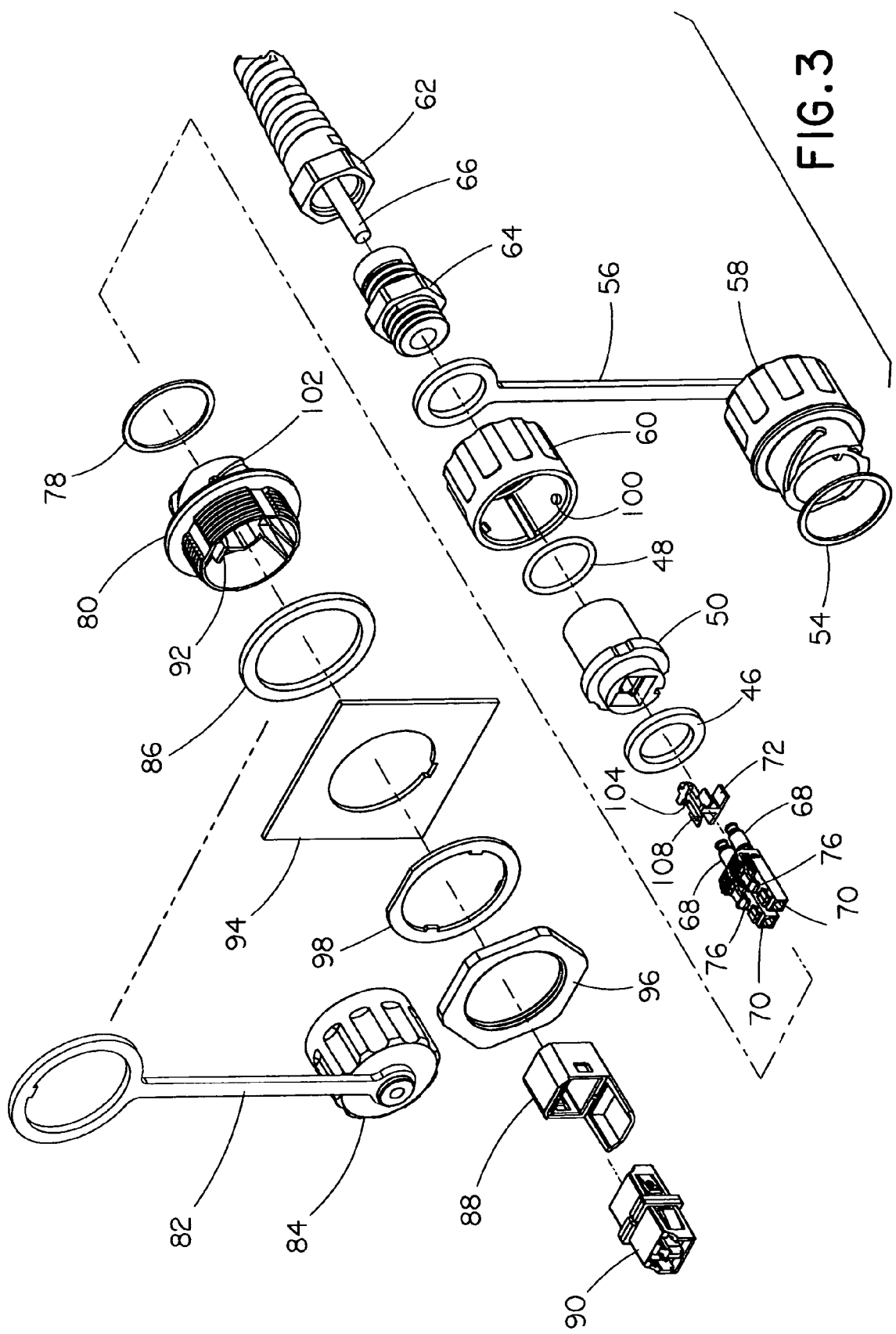
FIG. 3 is an exploded perspective view of the industrial connector of FIG. 2.
Figure 4:
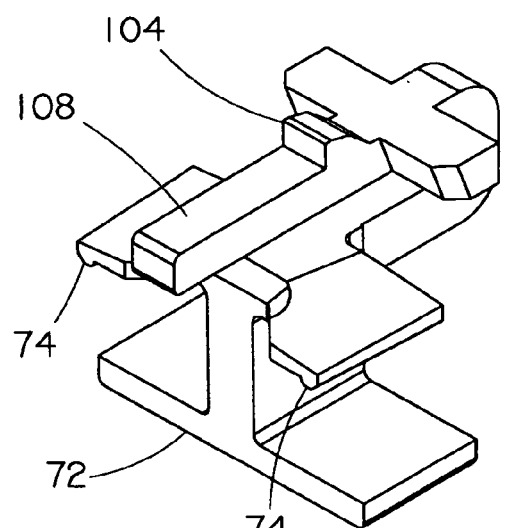
FIG. 4 is a front perspective view of a duplex clip shown in FIG. 3.
Figure 5:
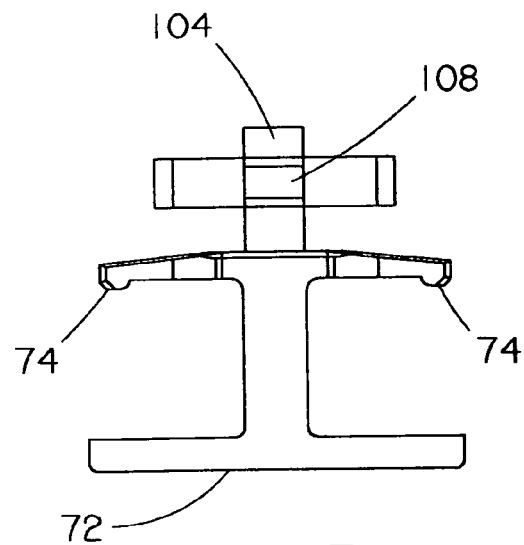
FIG. 5 is a front view of the duplex clip shown in FIG. 3.
Figure 6:
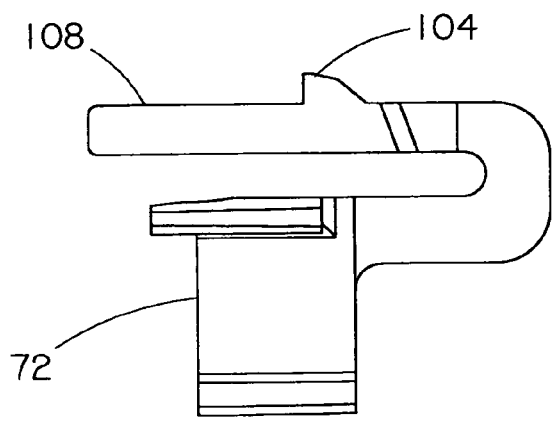
FIG. 6 is a right side view of the duplex clip shown in FIG. 3.
Figure 7:
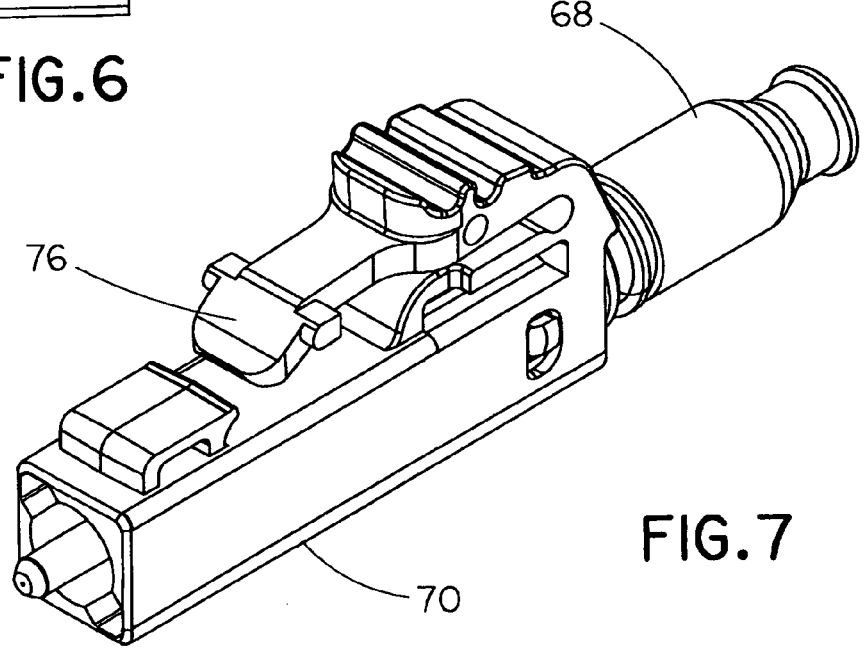
FIG. 7 is a front perspective view of an LC connector shown in FIG. 3.
Figure 8:
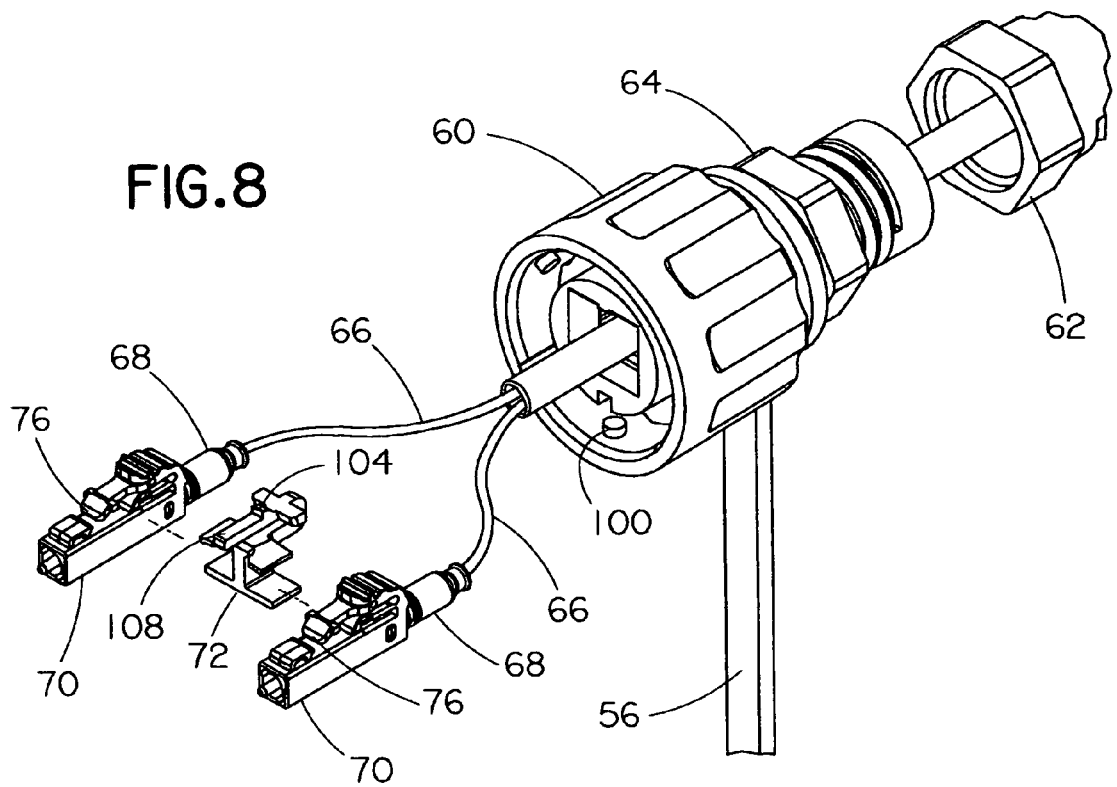
FIG. 8 is a partial exploded perspective view of a plug assembly for the industrial connector of FIG. 2.
Figure 9:
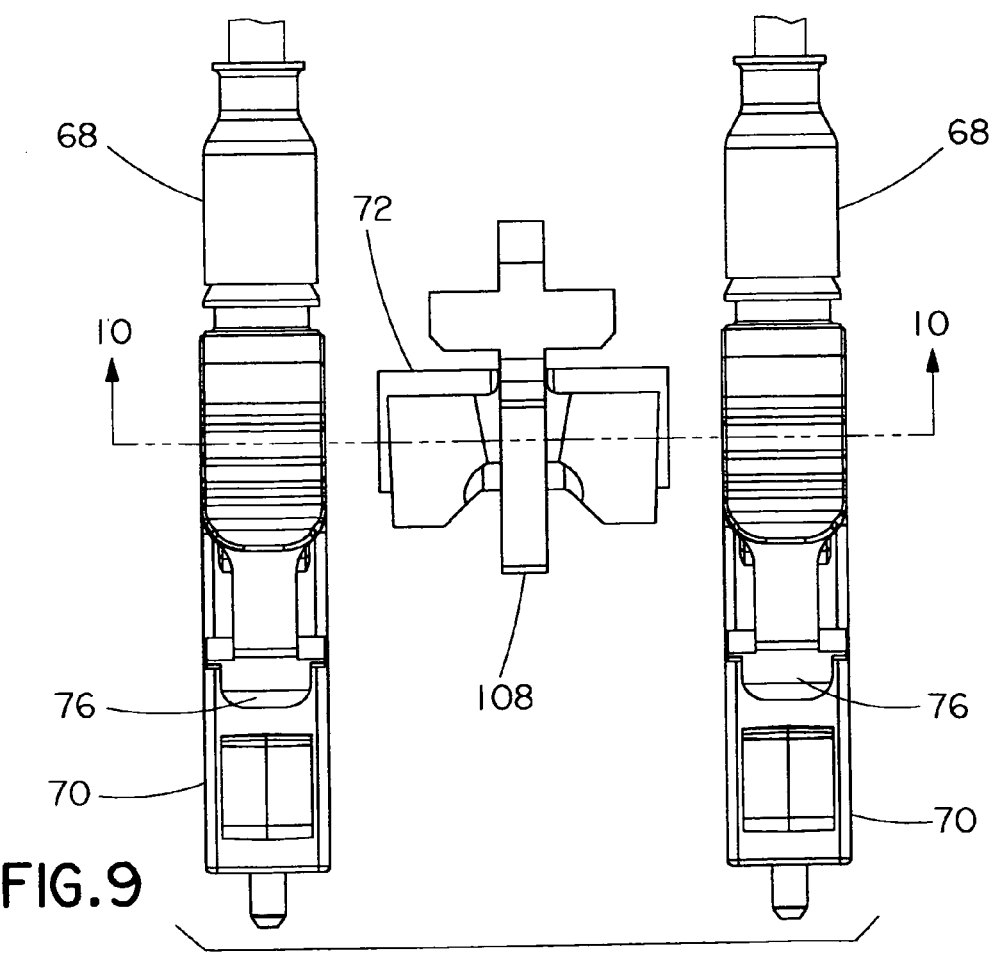
FIG. 9 is a top view of the two LC connectors and LC duplex clip shown in FIG. 8.
Figure 10:
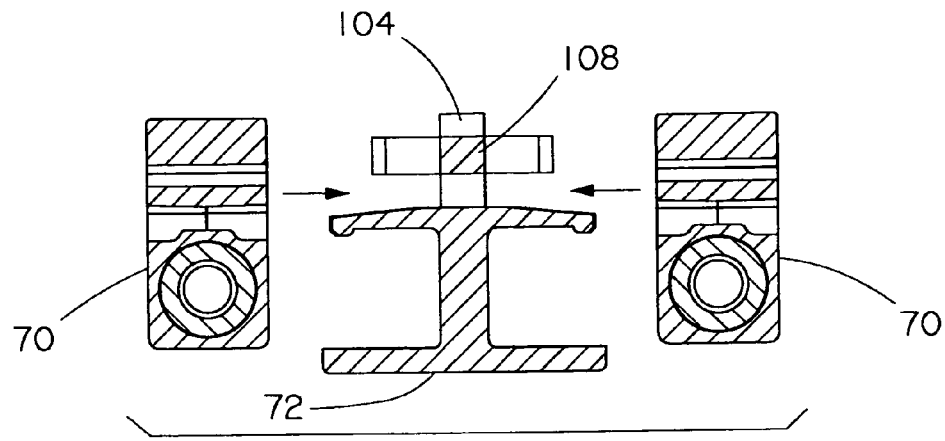
FIG. 10 is a cross-sectional view taken along lines 10—10 of FIG. 9.
Figure 11:
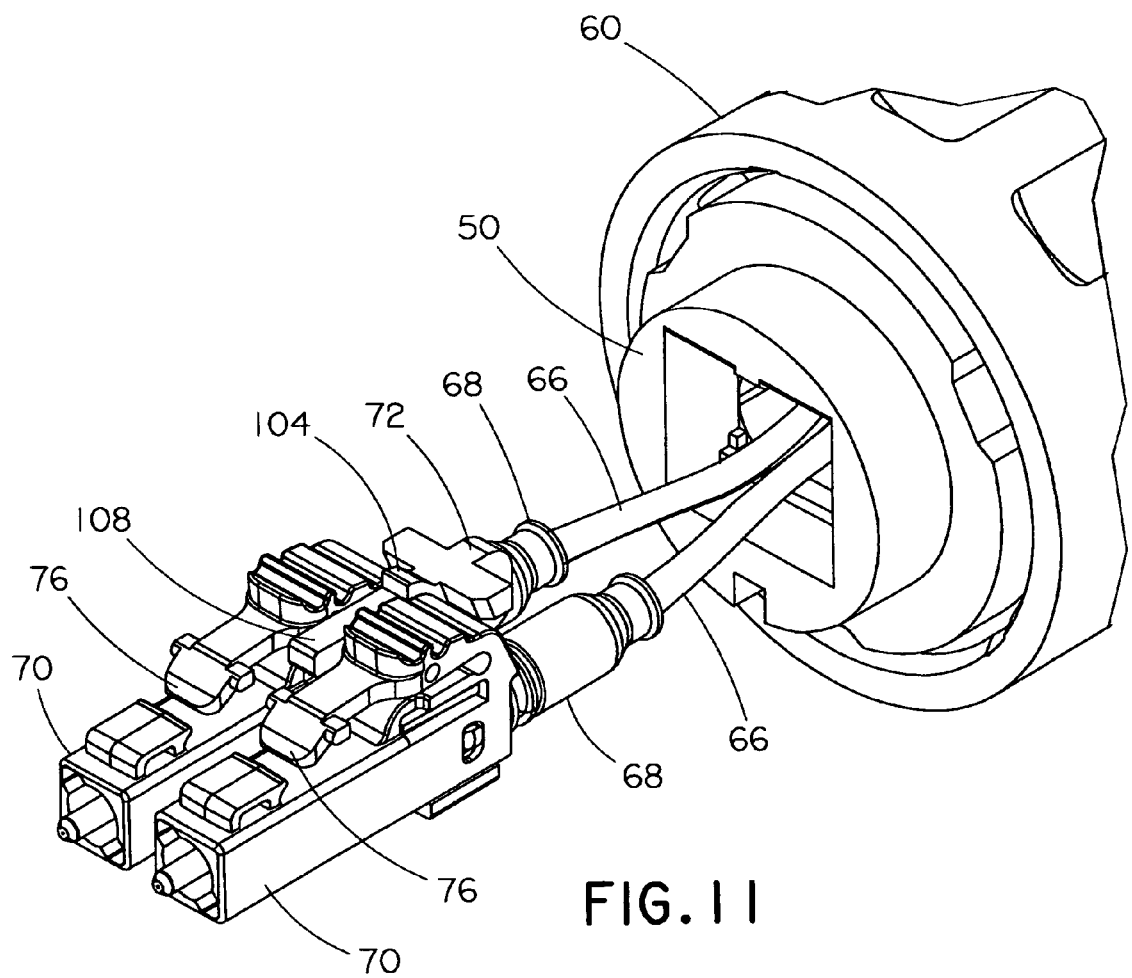
FIG. 11 is an enlarged perspective view of the plug assembly of FIG. 8, showing the LC connectors secured within the LC duplex clip.
Figure 28:
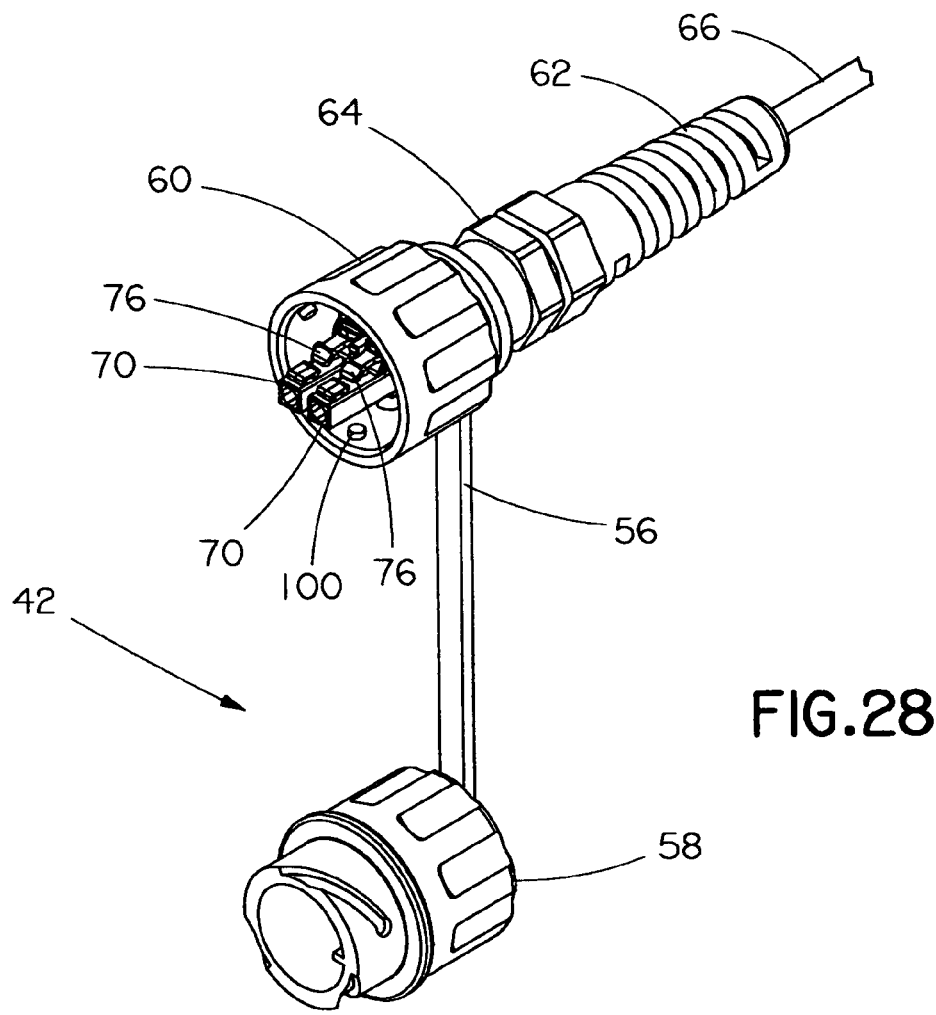
FIG. 28 is a perspective view of the plug assembly for the industrial connector of FIG. 2.
Figure 29:
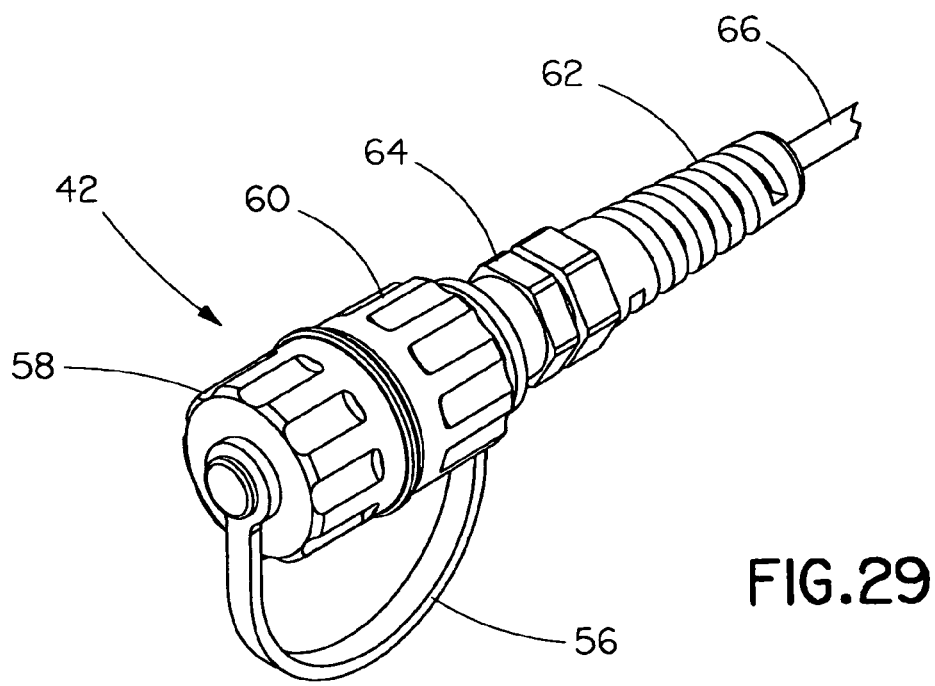
FIG. 29 is a perspective view of the plug assembly for the industrial connector of FIG. 2, showing the plug cap secured to the plug collar.
Figure 30:
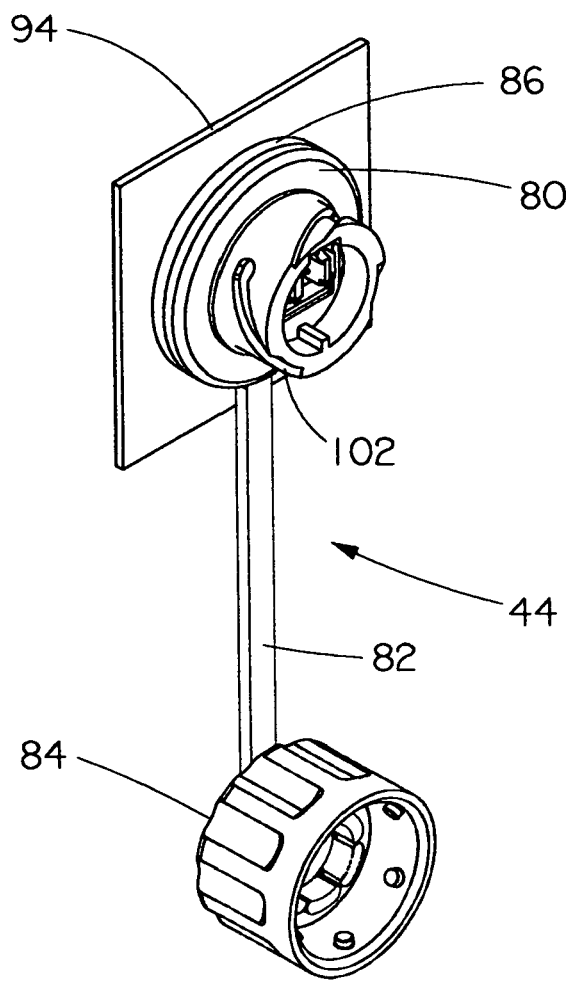
FIG. 30 is a perspective view of the bulkhead assembly for the industrial connector of FIG. 2.
Figure 31:
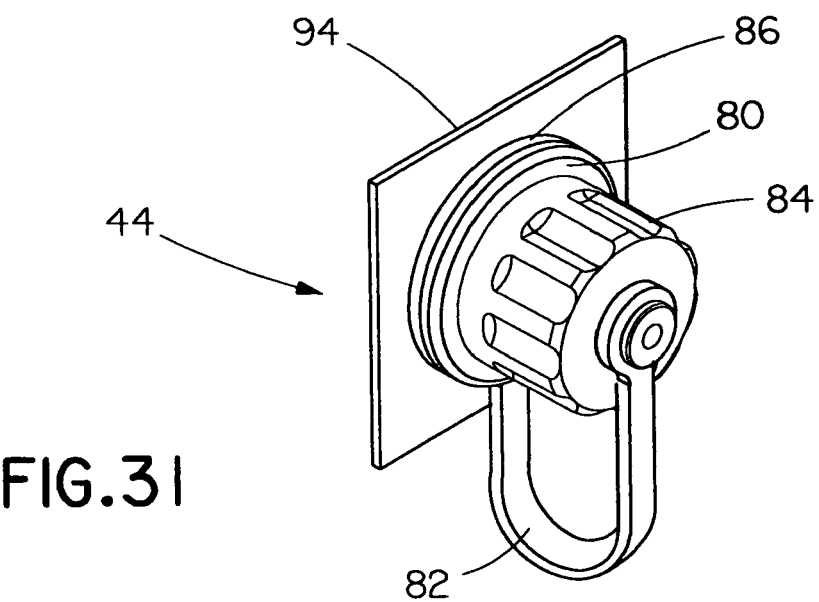
FIG. 31 is a perspective view of the bulkhead assembly for the industrial connector of FIG. 2, showing the bulkhead cap secured to the bulkhead.

FIGS. 1–31 illustrate an LC fiber optic industrial connector 40. It is likewise contemplated that other fiber optic style connectors, such as an SC or an ST style connector, may be utilized. FIG. 3 shows an exploded view of the components of industrial connector 40. FIGS. 28 and 29 show an assembled plug-side 42 of industrial connector 40, and FIGS. 30 and 31 show an assembled bulkhead-side 44 of industrial connector 40.

Referring to FIG. 3, in order to assemble plug-side 42 of industrial connector 40, plug sealing gasket 46 and O-ring 48 are first installed onto the front and rear sides of LC connector holder 50, respectively, creating an LC connector holder assembly. Plug face seal 54 and plug tether 56 are then installed onto plug cap 58, creating a plug cap assembly. Flexible boot 62, liquid-tight fitting 64 and the plug cap assembly are slid onto fiber cable 66. Plug collar 60, the LC connector holder assembly and crimp sleeves 68 are subsequently slid onto fiber cable 66. The fibers are then terminated onto two LC connectors 70 using standard termination procedures.

The two terminated LC connectors 70 are then slid into the sides of LC duplex clip 72 and secured by LC duplex clip latches 74 (see FIG. 5), which snap into recesses on LC connectors 70 (see FIG. 13). This assembly is then installed into the opening at the front of LC connector holder 50. Once seated completely inside LC connector holder 50, LC connector latches 76 become depressed and therefore inoperable (see FIG. 19).

Finally, plug collar 60 and the plug cap assembly are slid over the rear of the LC connector holder assembly and secured by threading liquid-tight fitting 64 into LC connector holder 50. Flexible boot 62 is threaded onto liquid-tight fitting 64. Once flexible boot 62 is fully secured, liquid-tight fitting 64 compresses onto the round fiber cable 66, creating a sealed cable/plug interface. Optionally, and as shown in FIG. 29, plug cap 58 may be secured to plug collar 60.

Referring to FIG. 3, in order to assemble the bulkhead-side 44 of industrial connector 40, bulkhead face seal 78 is assembled onto the front of bulkhead 80. Bulkhead-sealing gasket tether 82 and a plug sealing gasket (not shown) are assembled onto bulkhead cap 84, and this assembly is then slid over the threads at the rear of bulkhead 80. Alternatively, bulkhead-sealing gasket 86 is slid over the threads at the rear of bulkhead 80.

Duplex LC adapter module 88 including a duplex LC adapter 90 is snapped into the rear of bulkhead 80 and retained in place by integrated bulkhead latch 92. The sub-assembly is then positioned through the hole in mounting panel 94, in any of four 90 degree orientations. Bulkhead 80 can be rotated in 90 degree intervals before assembly nut 96 is secured. Thrust washer 98 is aligned over the threads at the rear of bulkhead 80, and assembly nut 96 is threaded onto bulkhead 80, securing the entire bulkhead assembly. Optionally, and as shown in FIG. 31, bulkhead cap 84 may be secured to bulkhead 80.

Referring to FIG. 3, in order to mate plug-side 42 and bulkhead-side 44 of industrial connector 40, LC connectors 70 are inserted into the opening in bulkhead 80. The keyway from LC connector holder 50 accurately aligns the LC industrial connector plug to bulkhead 80. Plug collar 60 is rotated into place and secured by pins 100 on plug collar 60 which mount into grooves 102 on bulkhead 80 (see FIGS. 21 and 22). The pin and groove mounting arrangement prohibits the mated components from separating.

The internal components of industrial connector 40 are secured in different ways than a typical copper or fiber industrial connector. The plug-side of a typical industrial connector is held together at only one location, the cable. When the flexible boot is threaded onto the liquid-tight fitting, the liquid-tight fitting compresses onto the cable, which creates the only locking mechanism within a typical industrial connector. It may be possible to use this mechanism on a standard copper-based industrial connector because the copper connector housing is crimped very tightly onto the cable. This allows the connector from the plug-side of a typical copper-based industrial connector to be a clearance fit into a hole in its connector holder. However, the copper connector housing is not secured to the connector holder.

Attaching the liquid-tight fitting solely to a fiber cable will not always provide a robust LC industrial connector. If a fiber connector were to loosen from the outer PVC jacket of a fiber cable at the crimp area, this could allow the LC connectors to move forward in the plug holder. However, the present invention provides the additional support means necessary for industrial connector 40 to function in a robust fashion.

Figure 17:
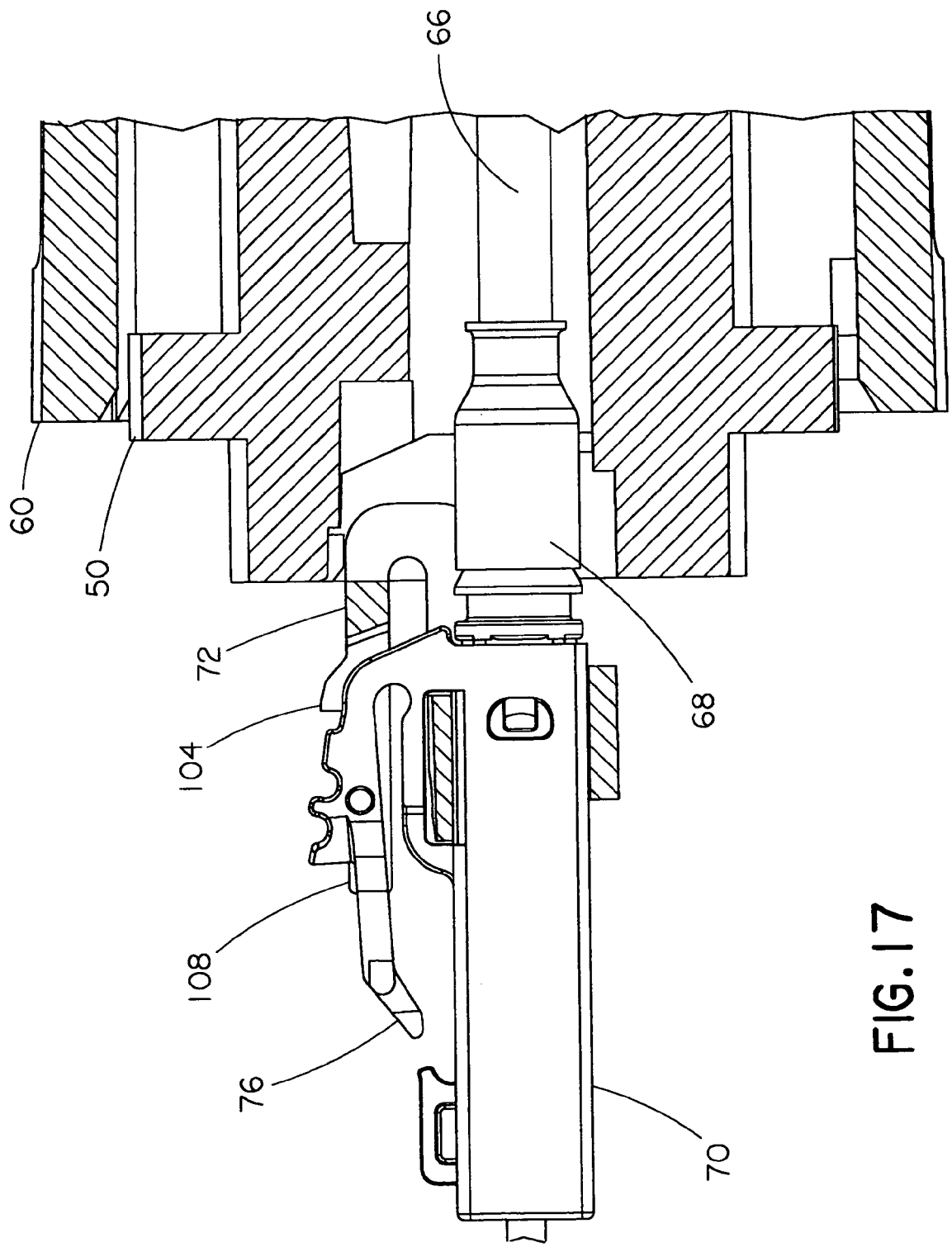
FIG. 17 is an enlarged cross-sectional view of the plug assembly shown in FIG. 16.
Figure 18:
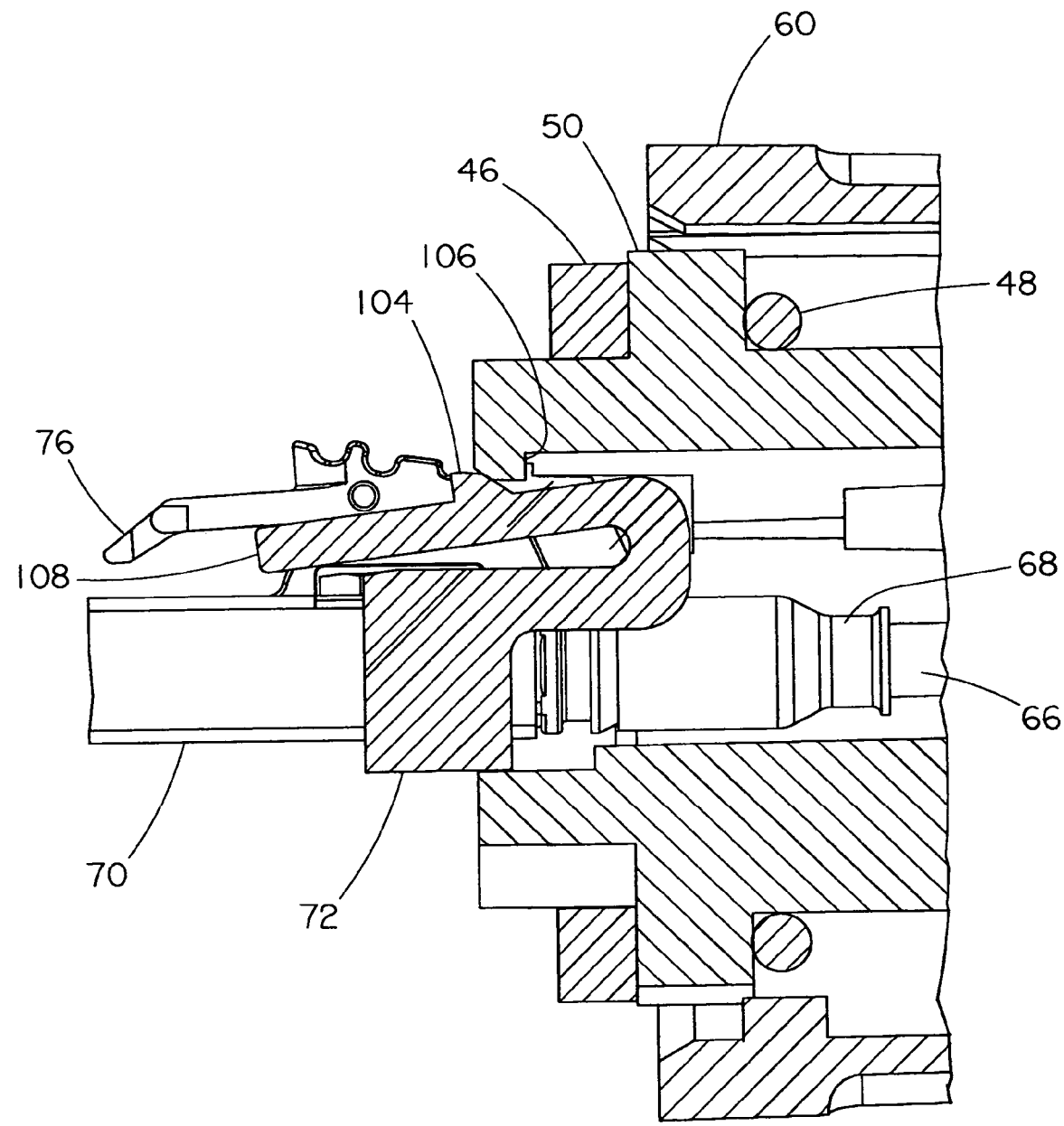
FIG. 18 is an enlarged cross-sectional view of the plug assembly shown in FIG. 16, showing the LC duplex clip being inserted into the LC connector holder.
Figure 19:
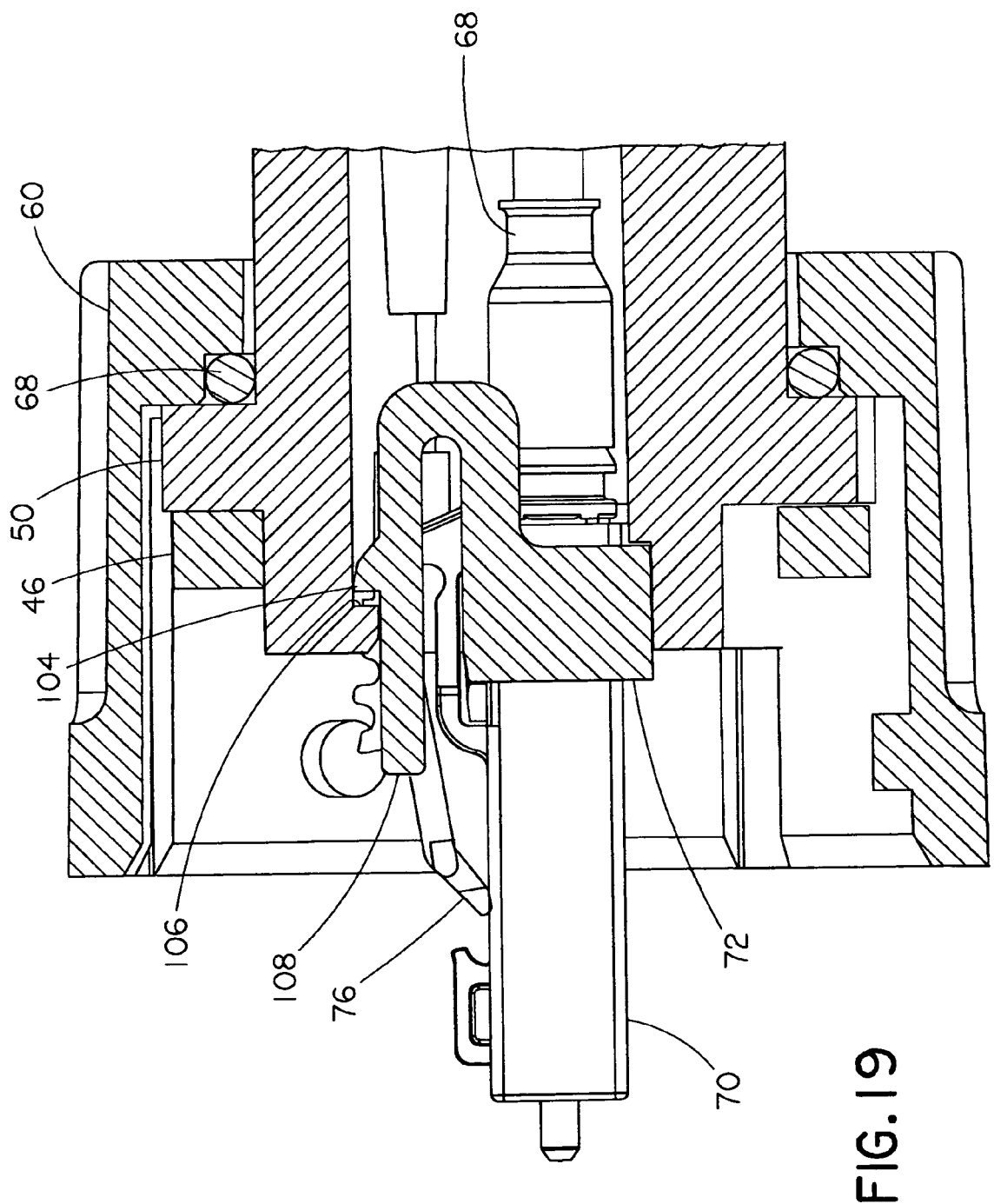
FIG. 19 is an enlarged cross-sectional view of the plug assembly shown in FIG. 16, showing the LC duplex clip after being inserted into the LC connector holder.
Figure 20:
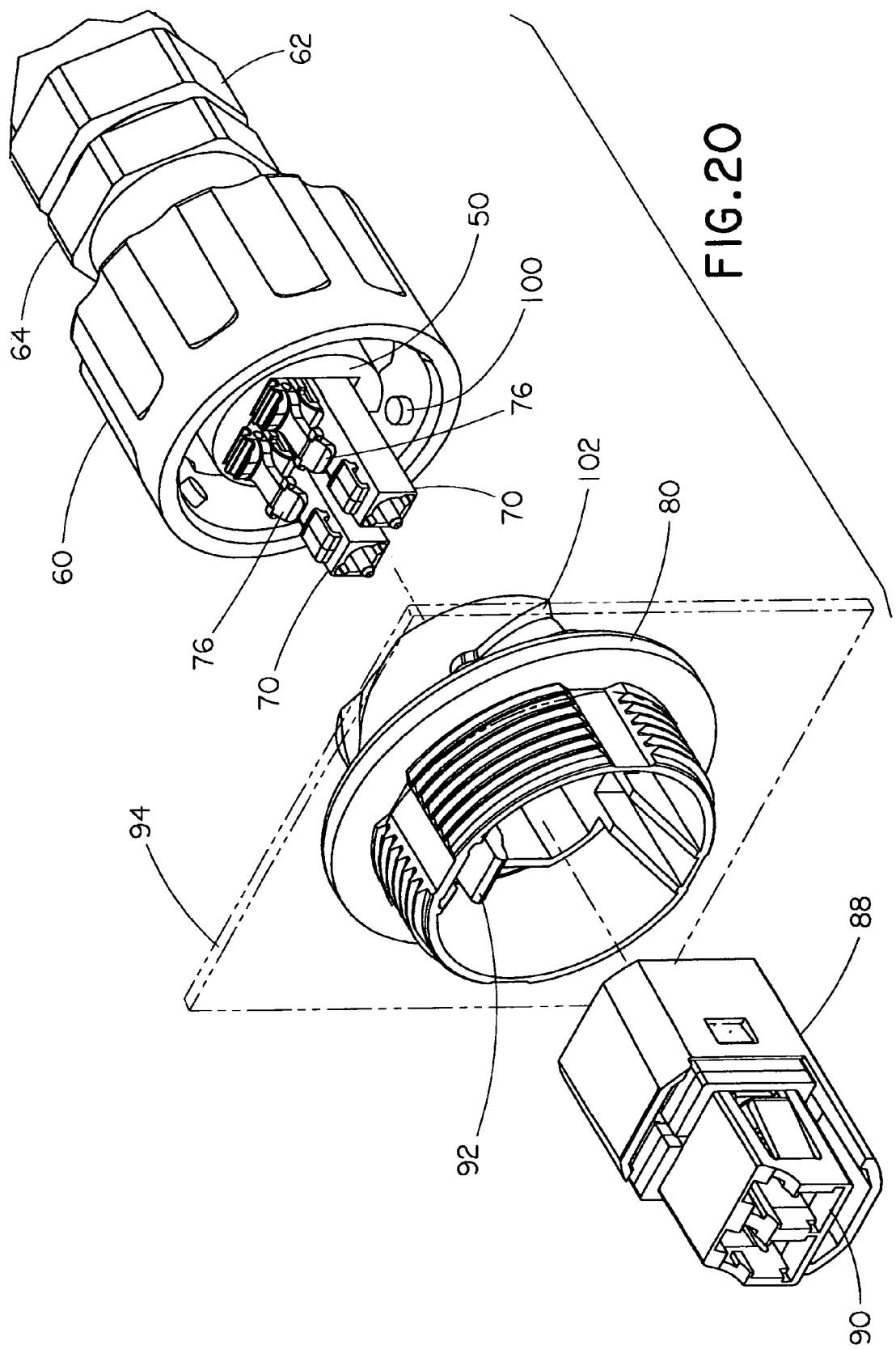
FIG. 20 is a partial exploded perspective view of the industrial connector of FIG. 2.
Figure 21:
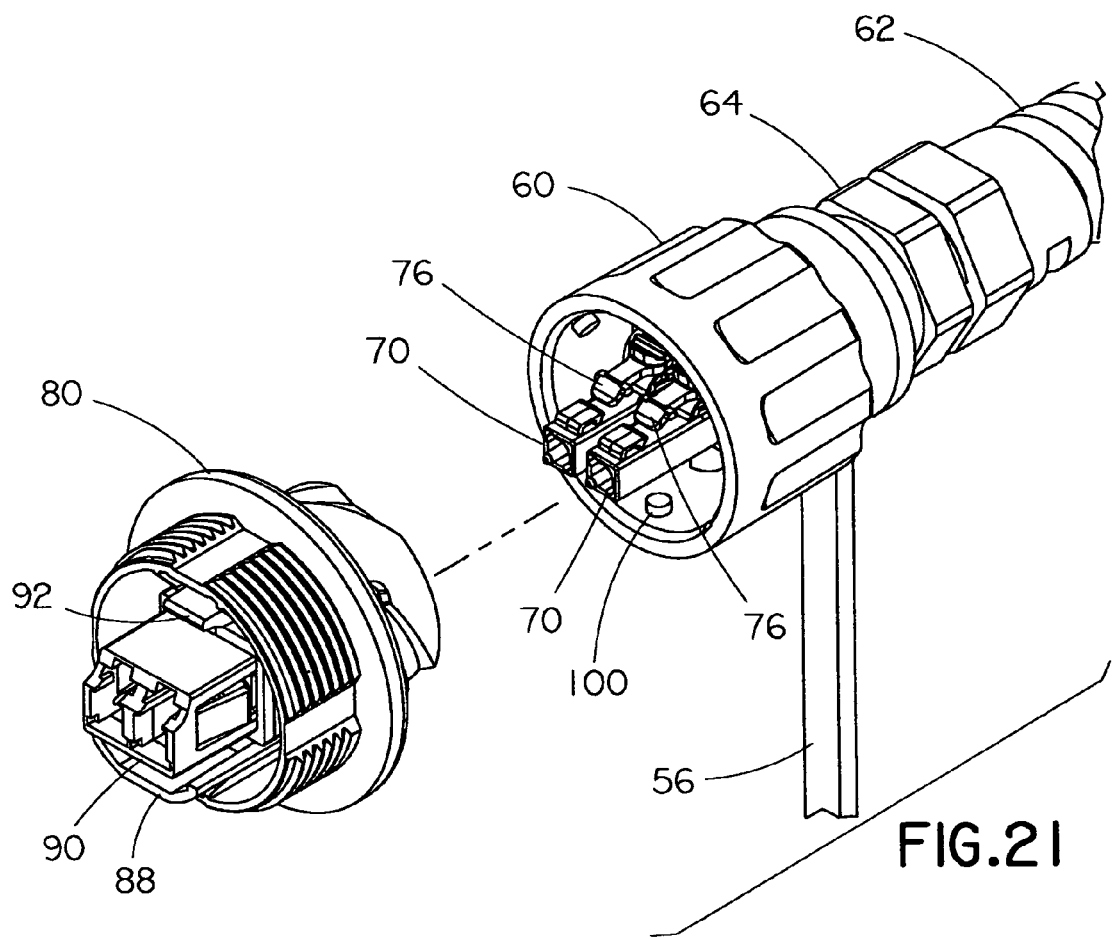
FIG. 21 is a partial exploded perspective view of the industrial connector of FIG. 2.
Figure 22:
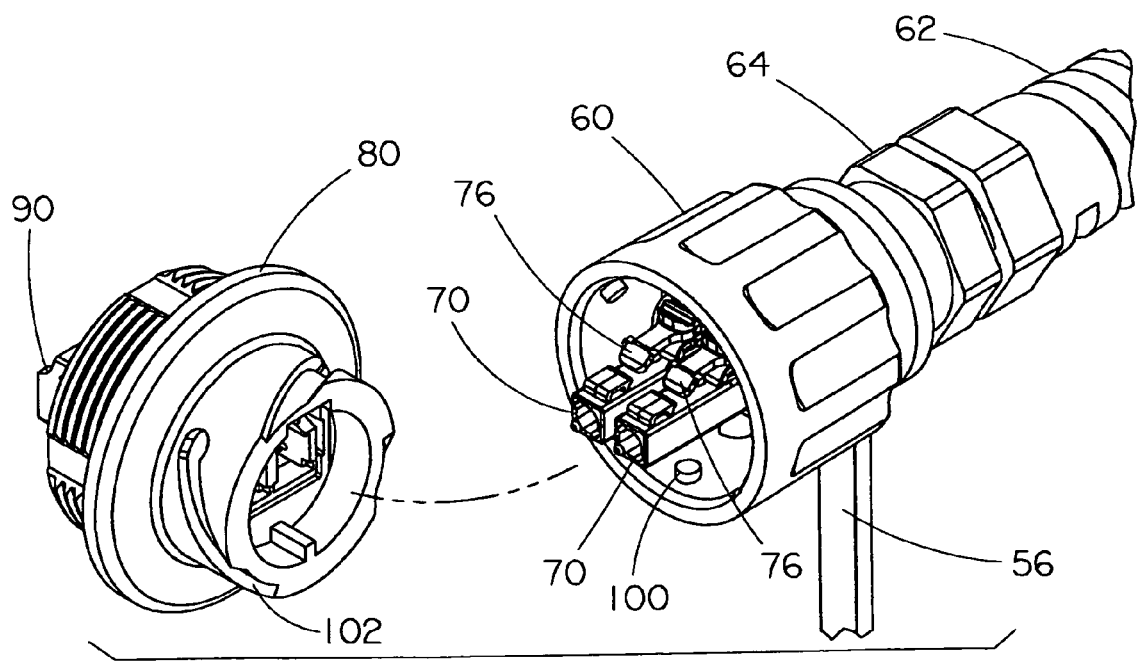
FIG. 22 is a partial exploded perspective view of the industrial connector of FIG. 2.
Figure 23:
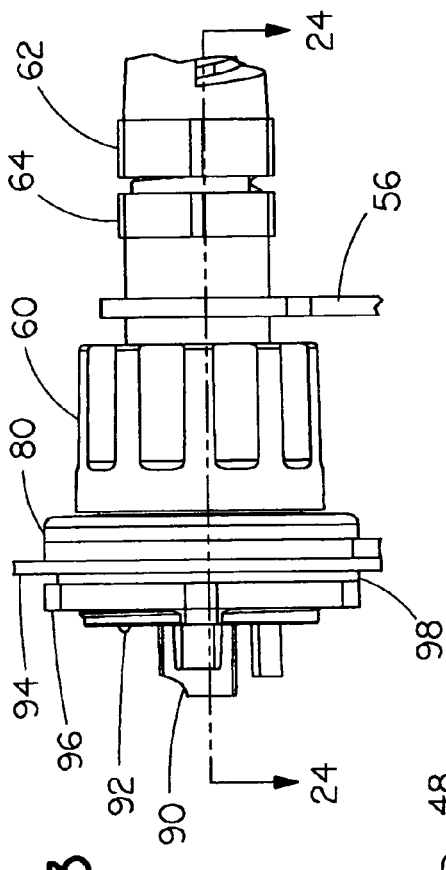
FIG. 23 is a side view of the industrial connector of FIG. 2.
Figure 24:
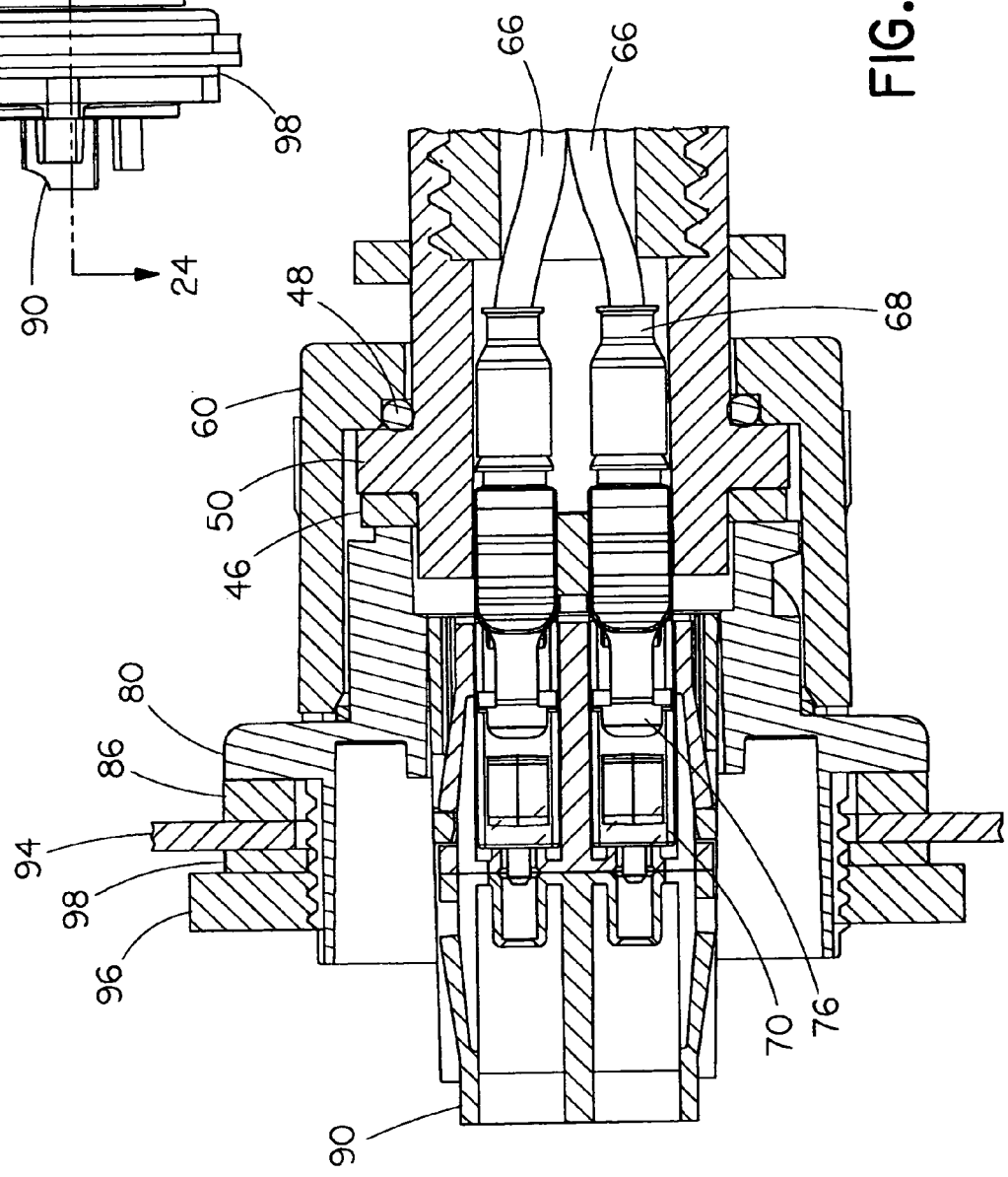
FIG. 24 is a cross-sectional view taken along lines 24—24 of FIG. 23.
Figure 25:
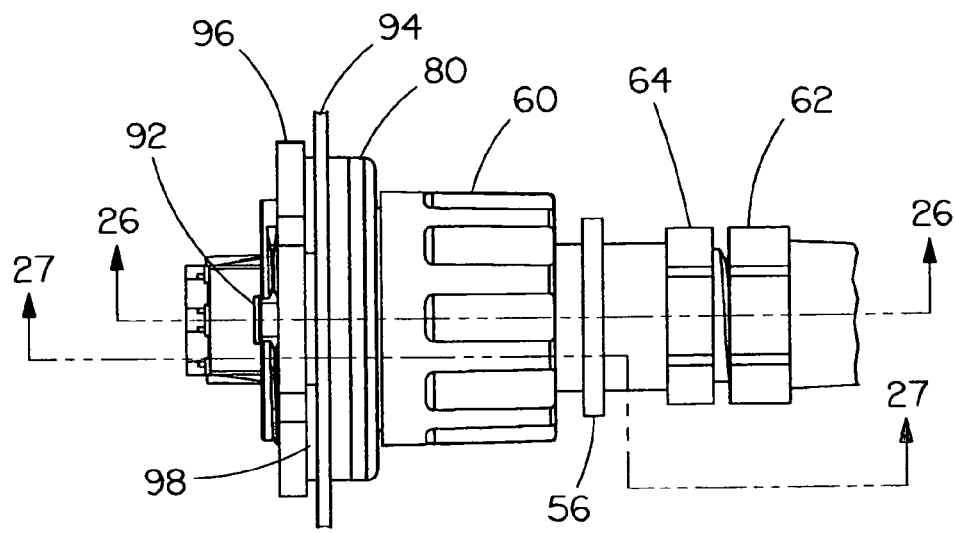
FIG. 25 is a top view of the industrial connector of FIG. 2.

As shown in FIGS. 10–13, LC connectors 70 are assembled into the sides of LC duplex clip 72. The duplex clip/connector assembly is then slid into the front opening of LC connector holder 50, as best seen in FIGS. 17 and 18. The LC duplex clip/connector assembly becomes fully seated inside LC connector holder 50 once the LC connector housings bottom out inside LC connector holder 50. At this point, LC duplex clip latch 104 engages inside LC connector holder 50, creating an audible click. As shown in FIG. 19, latch 104 prevents LC connectors 70 from falling out of the front of LC connector holder 50 during removal of the LC industrial connector plug from bulkhead 80.

The present duplex clip design also solves the problem with conventional industrial connectors in general. The final assembly task for the plug-side of a typical industrial connector requires tightening of the nut from the flexible boot onto a liquid-tight fitting. Tightening this nut with substantial torque shifts the cable inside the connector holder forward. In a conventional industrial connector, this forces the plug to shift forward in the connector holder, because the only gripping force on the cable is at the cable strain relief.

Figure 26:
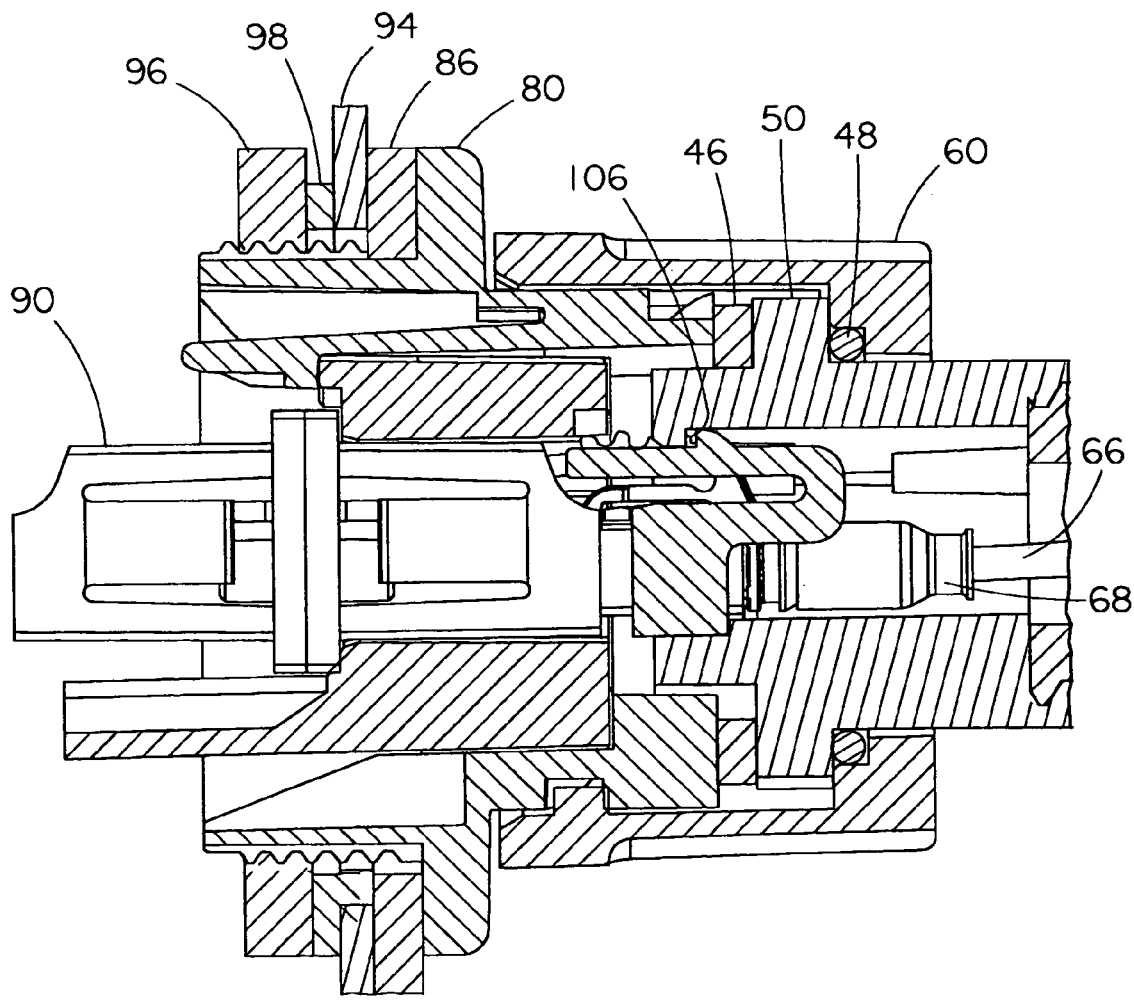
FIG. 26 is a cross-sectional view taken along lines 26—26 of FIG. 25.
Figure 27:
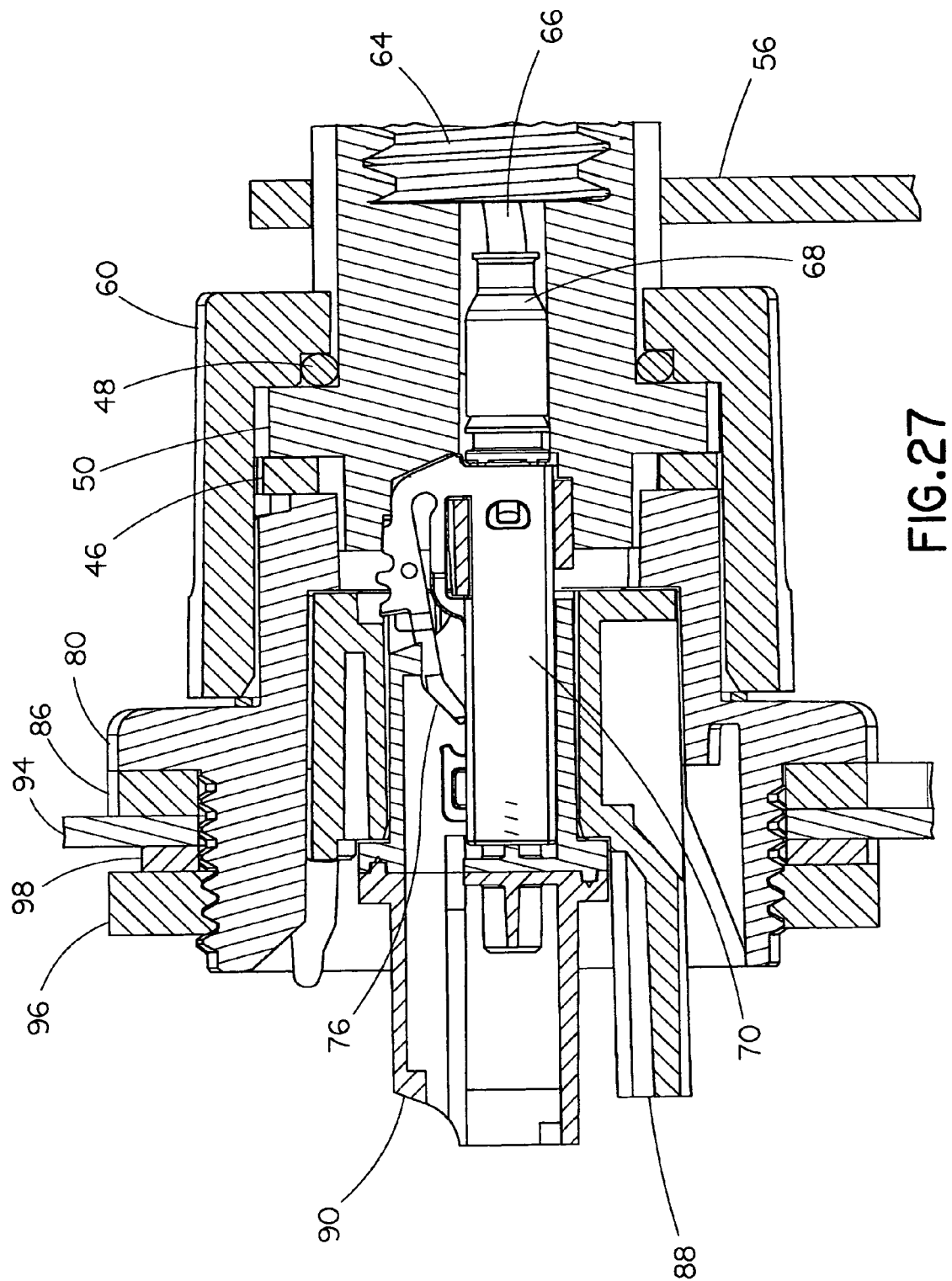
FIG. 27 is a cross-sectional view taken along lines 27—27 of FIG. 25.

However, in the present invention, when the nut from flexible boot 62 is secured onto liquid-tight fitting 64, LC connectors 70 will not move forward because duplex clip latch 104 catches onto retaining wall 106 at the front of LC connector holder 50, as shown in FIGS. 19 and 26. This retaining feature secures LC connectors 70 more precisely in the axial direction. When plug-side 42 of industrial connector 40 is mated with another LC connector 70 at the far side of LC adapter 90, this will position the plug-side ferrule endface with more precision. This, in turn, will ensure a tighter range of spring forces in LC connectors 70, which will ultimately provide more reliable optical measurements.

Additionally, LC connectors 70 can be removed at any time from the front of LC connector holder 50. First, flexible boot 62 is loosened to release the compression force on cable 66. Next, cantilevered beam 108 at the front of LC duplex clip 72 is deflected downward with a finger or screwdriver, which disengages LC duplex clip latch 104 from retaining wall 106 found on LC connector holder 50. Thus, LC connectors 70 are allowed to be pulled forward. Releasing LC connectors 70 from LC connector holder 50 will allow the ferrule endfaces to be repolished or inspected with a magnification scope at any time after connector termination, if necessary.

The disclosed invention provides an LC fiber optic industrial connector that allows simple removal of the LC connectors during or after termination. It should be noted that the above-described and illustrated embodiments and preferred embodiments of the invention are not an exhaustive list of the forms such an LC fiber optic industrial connector in accordance with the invention might take; rather, they serve as exemplary and illustrative of embodiments of the invention as presently understood. Many other forms of the invention are believed to exist.

The invention claimed is:

1. A fiber optic industrial connector comprising:
   a connector holder having a retaining wall along an inside surface thereof; and
   a duplex clip assembly secured within the connector holder, the assembly comprising a duplex clip and two connectors secured within the duplex clip,
   wherein the duplex clip comprises a front surface and a rear surface, two openings positioned between the front surface and the rear surface, and a projecting member extending from the rear surface and toward the front surface.

2. The connector of claim 1, wherein each opening is substantially C-shaped.

3. The connector of claim 1, wherein each opening has a latch on an inside surface thereof.

4. The connector of claim 1, wherein the projecting member includes a latch positioned thereon.

5. The connector of claim 1, wherein the projecting member is a cantilevered beam.

6. The connector of claim 1, wherein each connector is an LC style connector.

7. A duplex clip and connector assembly comprising:
   a duplex clip; and
   two LC style connectors secured within the duplex clip,
   wherein the duplex clip comprises a front surface and a rear surface, two openings positioned between the front surface and the rear surface, and a projecting member extending from the rear surface and toward the front surface.

8. The assembly of claim 7, wherein each opening is substantially C-shaped.

9. The assembly of claim 7, wherein each opening has a latch on an inside surface thereof.

10. The assembly of claim 7, wherein the projecting member includes a latch positioned thereon.

11. The assembly of claim 7, wherein the projecting member is a cantilevered beam.

12. A method for removably securing connectors within a connector holder, the method comprising the steps of:
    inserting two connectors into sides of a duplex clip to form a duplex clip and connector assembly wherein the assembly comprises a duplex clip and two connectors secured within the duplex clip, the duplex clip comprising a front surface and a rear surface, two openings positioned between the front surface and the rear surface, and
    a projecting member extending from the rear surface and toward the front surface, the projecting member including a latch positioned therein; and
    inserting the assembly into a connector holder having a retaining wall along an inside surface thereof, wherein the latch engages the retaining wall inside the connector holder.

13. The method of claim 12, further comprising the steps of:
    depressing downward the projecting member to disengage the latch from the retaining wall inside the copnector holder; and
    removing the connectors from the connector holder.

14. A fiber optic industrial connector comprising:
    a connector holder; and
    a duplex clip assembly secured within the connector holder, the assembly comprising a duplex clip and two LC style connectors secured within the duplex clip.
    wherein the duplex clip comprises a front surface and a rear surface, two openings positioned betweqn the front surface and the rear surface, and a projecting member extending from the rear surface and toward the front surface.

* * * * *

UNITED STATES PATENT AND TRADEMARK OFFICE
CERTIFICATE OF CORRECTION

| | | |
|---|---|---|
| PATENT NO. | : 7,234,877 B2 | Page 1 of 1 |
| APPLICATION NO. | : 11/257938 | |
| DATED | : June 26, 2007 | |
| INVENTOR(S) | : Thomas M. Sedor | |

It is certified that error appears in the above-identified patent and that said Letters Patent is hereby corrected as shown below:

In Claim 14, Col. 6, line 31 reads: "rear surface, two openings positioned betweqn the front" should read -- "rear surface, two openings positioned between the front" --

Signed and Sealed this

Twentieth Day of May, 2008

JON W. DUDAS
*Director of the United States Patent and Trademark Office*